United States Patent [19]

Nagata et al.

[11] Patent Number: 5,719,957

[45] Date of Patent: Feb. 17, 1998

[54] IMAGE FORMING APPARATUS WHICH ADDS IDENTIFYING INFORMATION TO IMAGES

[75] Inventors: Hideyuki Nagata, Tokyo; Shigeo Yamagata, Yokohama, both of Japan

[73] Assignee: Canon Kabushiki Kaisha, Tokyo, Japan

[21] Appl. No.: 357,012

[22] Filed: Dec. 16, 1994

[30] Foreign Application Priority Data

Dec. 22, 1993 [JP] Japan .................. 5-324221

[51] Int. Cl.$^6$ .......................... H04N 1/40; H04N 1/387; H04N 1/46
[52] U.S. Cl. .................. 382/176; 358/455; 358/456; 358/462
[58] Field of Search ........................... 358/447, 448, 358/456, 455, 429, 450, 453, 462, 539, 540, 296, 298; 382/252, 176; 395/135, 773, 792, 793, 803

[56] References Cited

U.S. PATENT DOCUMENTS

| | | | |
|---|---|---|---|
| 5,257,119 | 10/1993 | Funada et al. | 358/438 |
| 5,363,202 | 11/1994 | Udagawa et al. | 358/501 |
| 5,448,656 | 9/1995 | Tanaka | 382/252 |
| 5,550,647 | 8/1996 | Koike | 358/462 |
| 5,557,412 | 9/1996 | Saito et al. | 358/296 |
| 5,587,808 | 12/1996 | Hagihara et al. | 358/462 |
| 5,617,216 | 4/1997 | Wada | 358/298 |

FOREIGN PATENT DOCUMENTS

| | | | |
|---|---|---|---|
| 467684 | 1/1992 | European Pat. Off. | G06F 15/68 |
| 508123 | 10/1992 | European Pat. Off. | G03G 15/00 |
| 551016 | 7/1993 | European Pat. Off. | H04N 1/387 |
| 558314 | 9/1993 | European Pat. Off. | H04N 1/46 |

*Primary Examiner*—Edward L. Coles, Sr.
*Assistant Examiner*—Tia M. Harris
*Attorney, Agent, or Firm*—Fitzpatrick, Cella, Harper & Scinto

[57] ABSTRACT

In an image forming apparatus for forming a binarized image upon adding on additional information without degrading image quality, a mode signal assumes an "H" or "L" level. When the mode signal is at the "H" level, a pattern in which a binarized output attains the "H" level for two successive pixels appears in a low-density area of the image formed, thereby indicating the start of data representing additional information. When the mode signal is at the "L" level, additional information is represented by the level of a control signal f. The binarized output is controlled in such a manner that the spacing of black pixels becomes an odd number of pixels in a low-density area of the formed image in a case where the control signal f is at the "L" level and an even-number of pixels in the low-density area of the formed image in a case where the control signal f is at the "H" level. In other words, the additional information is expressed by indicating "0" when the spacing of black pixels is an odd number and "1" when the spacing of black pixels is an even number.

18 Claims, 11 Drawing Sheets

WHEN CONTROL SIGNAL f = "L"

WHEN CONTROL SIGNAL f = "H"

◍ PIXEL POSITION AT WHICH BINARIZED OUTPUT IS "H"

○ PIXEL POSITION AT WHICH BINARIZED OUTPUT IS "L"

IMAGE FORMING APPARATUS WHICH ADDS IDENTIFYING INFORMATION TO IMAGES

BACKGROUND OF THE INVENTION

This invention relates to an image forming method and apparatus and, more particularly, to an image forming method and apparatus, such as a copier, for forming an image by a pseudo-halftone processed binarized signal.

In order to make it easy to specify a full-color copier from the output image produced by the copying operation of the copier, a known copier is provided with a function for adding information such as a specific pattern to an output signal obtained by binarizing the image signal. This function is used to conduct follow-up investigations regarding the unlawful copying of images.

Figure 12:
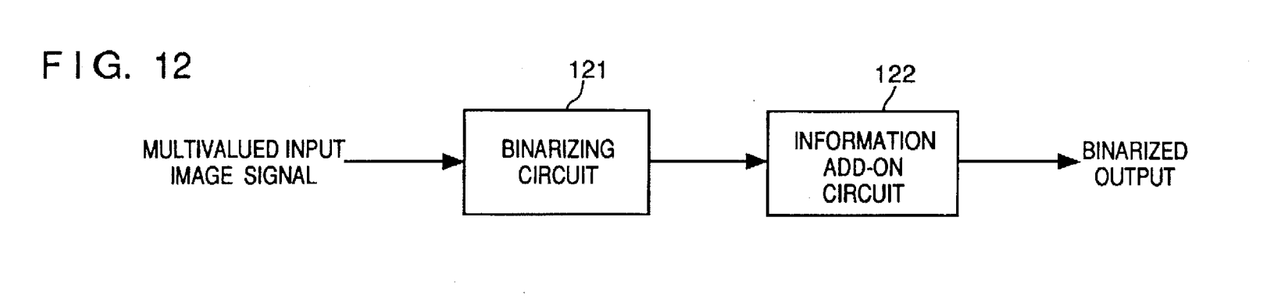
FIG. 12 is a block diagram showing a procedure for adding on information in accordance with an example of the prior art.

FIG. 12 is a block diagram illustrating the constitution of the above-mentioned function with which the conventional full-color copier is provided. In FIG. 12, numeral 121 denotes a binarizing circuit for converting an input multivalued image signal to binary data, and numeral 122 denotes an information add-on circuit which moves the "H"-level pixel position of the binarized signal outputted by the binarizing circuit 121, thereby controlling the "H"-level spacing of the binarized signal to add on information.

Figure 13:
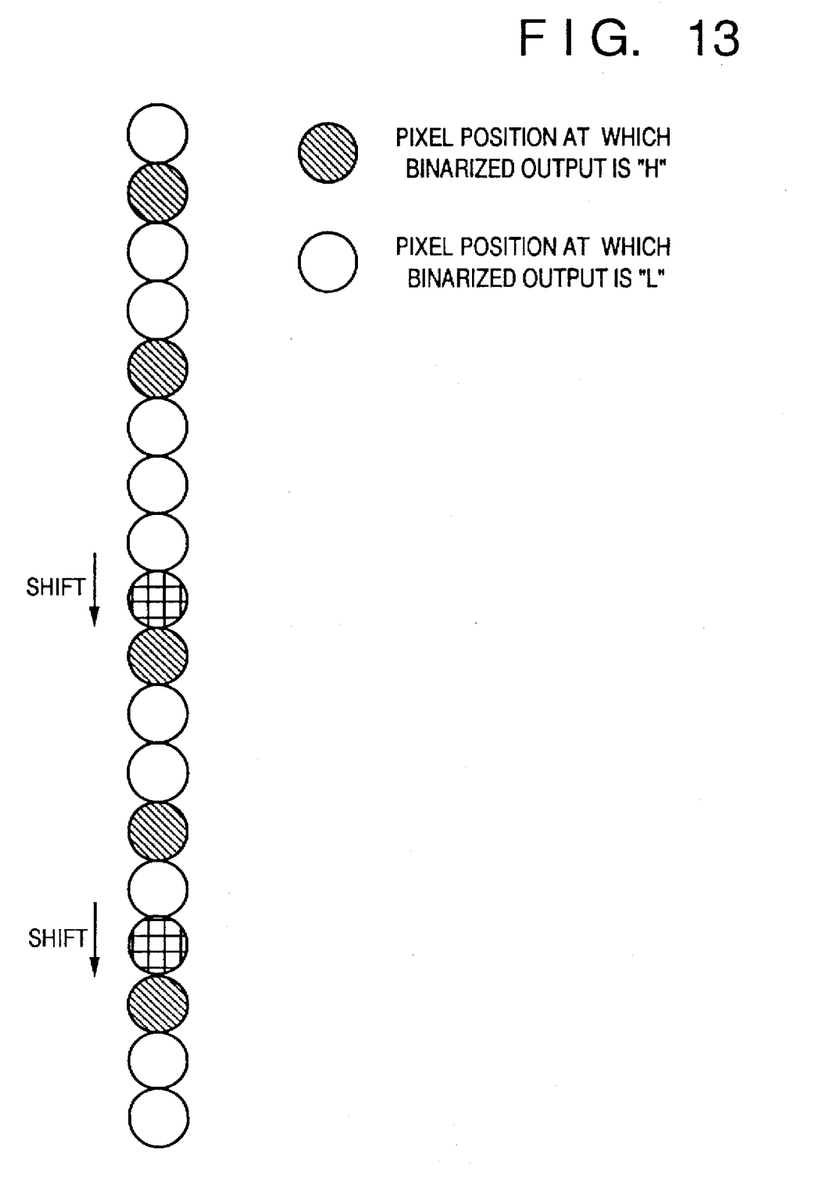
FIG. 13 is a diagram showing the manner in which pixel position is shifted in a binarized output signal in accordance with an example of the prior art.

As shown in FIG. 13, the adding on of information is carried out in such a manner that the "H" level of the binarized output signal is shifted to the next pixel position, whereby the "H"-level signal interval is controlled to be an odd or even number, as a result of which "0" or "1" information can be expressed. As for the area in which such information is added on, the density of neighboring pixels is detected and a comparatively low-density area is selected in such a manner that any deterioration in image quality by information add-on will be inconspicuous.

With this example of the prior art, however, the disposition of the binarized signal is disturbed because the position of the "H" level in the binarized signal placed at the optimum position in binarizing processing is shifted for the sake of the information add-on processing. As a result, even if the area to which the information is added on is a low-density area considered to be one in which deterioration of the image is inconspicuous, a noticeable decline in image quality still occurs.

Further, in a case where a threshold value which prevails when the input image signal is binarized is decided dynamically in dependence upon the density of neighboring pixels, detection of neighboring density at the time of binarization is performed independently of detection of neighboring density at the time of information add-on according to the conventional method. As a result, two circuits of similar construction are required. This leads to circuitry of larger scale.

SUMMARY OF THE INVENTION

Accordingly, it is an object of the present invention to provide an image forming apparatus in which it is possible to form an image by providing an input image with additional information without producing a decline in image quality.

According to the present invention, the foregoing object is attained by providing an image forming apparatus for performing binarization processing by adding multivalued image data to predetermined additional information, and forming a pseudo-halftone image, comprising: first input means for inputting the multivalued image data, second input means for inputting the additional information, binarizing means for executing binarization based upon the input multivalued image data and the additional information upon taking into account density values of neighboring pixels of a pixel represented by the multivalued image data, memory means for storing binarized data binarized by said binarizing means and feedback control means for controlling binarization of subsequently input multivalued image data based upon the binarized data stored by said memory means, wherein said feedback control means performs control so as to produce binarized data by making a specific pixel a black pixel or a white pixel in such a manner that black pixels will be arrayed at a spacing of an even number or odd number of pixels in a comparatively low-density region in a predetermined direction on a formed image so that the additional information can be expressed on the image.

It is another object of the present invention to provide an image forming apparatus for forming an image by simultaneously binarizing an input multivalued image and additional information.

According to the present invention, the foregoing object is attained by providing an image forming apparatus for performing binarization processing by adding multivalued image data to predetermined additional information, and forming a pseudo-halftone image, comprising: input means for inputting the multivalued image data, binarizing means for adding the additional information onto the multivalued image data and simultaneously binarizing the multivalued image data and the additional information and feedback means for feeding results of binarization obtained by said binarizing means back to binarization of subsequently input multivalued image data.

It is another object of the present invention to provide an image forming method for forming an image by simultaneously binarizing an input multivalued image and additional information.

According to the present invention, the foregoing object is attained by providing an image forming method of performing binarization processing by adding multivalued image data to predetermined additional information, and forming a pseudo-halftone image, comprising: an input step of inputting the multivalued image data, a binarizing step of adding the additional information onto the multivalued image data and simultaneously binarizing the multivalued image data and the additional information and a feedback step of feeding results of binarization obtained at said binarizing step back to binarization of subsequently input multivalued image data.

In accordance with the present invention as described above, binarized data is produced by making a specific pixel a black pixel or a white pixel in such a manner that black pixels will be arrayed at a spacing of an even number or odd number of pixels in a comparatively low-density region in a predetermined direction on a formed image in order that the additional information will be expressed on the image.

The invention is particularly advantageous since the additional information can be expressed by changing only the specific pixel, and the additional information can be added to the binarized image without causing almost any disturbance in the binarized output overall, namely without bringing about a decline in image quality.

Further, in accordance with the invention, feedback means is used to control the binarization of the input multivalued image data, and a predetermined pattern is formed by making the specific pixel a black pixel or a white pixel. As a result, information can be added on at the same time that binarization of the image is performed. The circuitry can be reduced in size in comparison with the case in which information is added on after the execution of binarization processing.

Other features and advantages of the present invention will be apparent from the following description taken in conjunction with the accompanying drawings, in which like reference characters designate the same or similar parts throughout the features thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<First Embodiment>

[Description of Overall Construction of Apparatus (FIGS. 1A and 1B)]

Figure 1A:
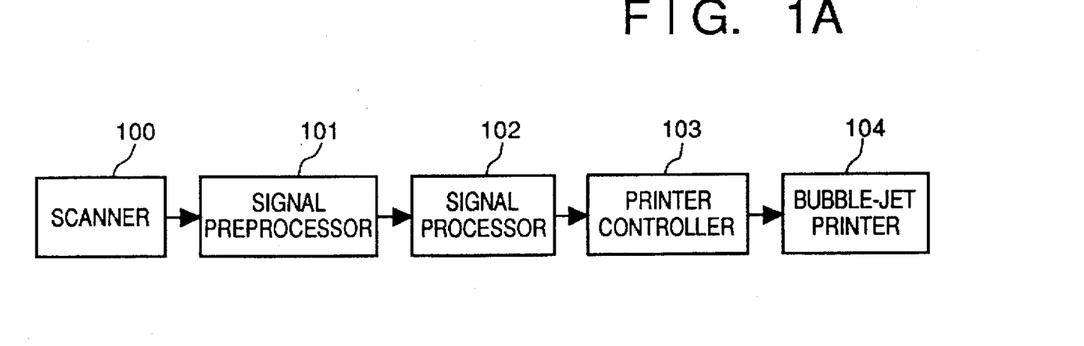
FIGS. 1A and 1B are block diagrams illustrating the construction of a copier having a built-in bubble-jet printer serving as a typical embodiment of the present invention.
Figure 1B:
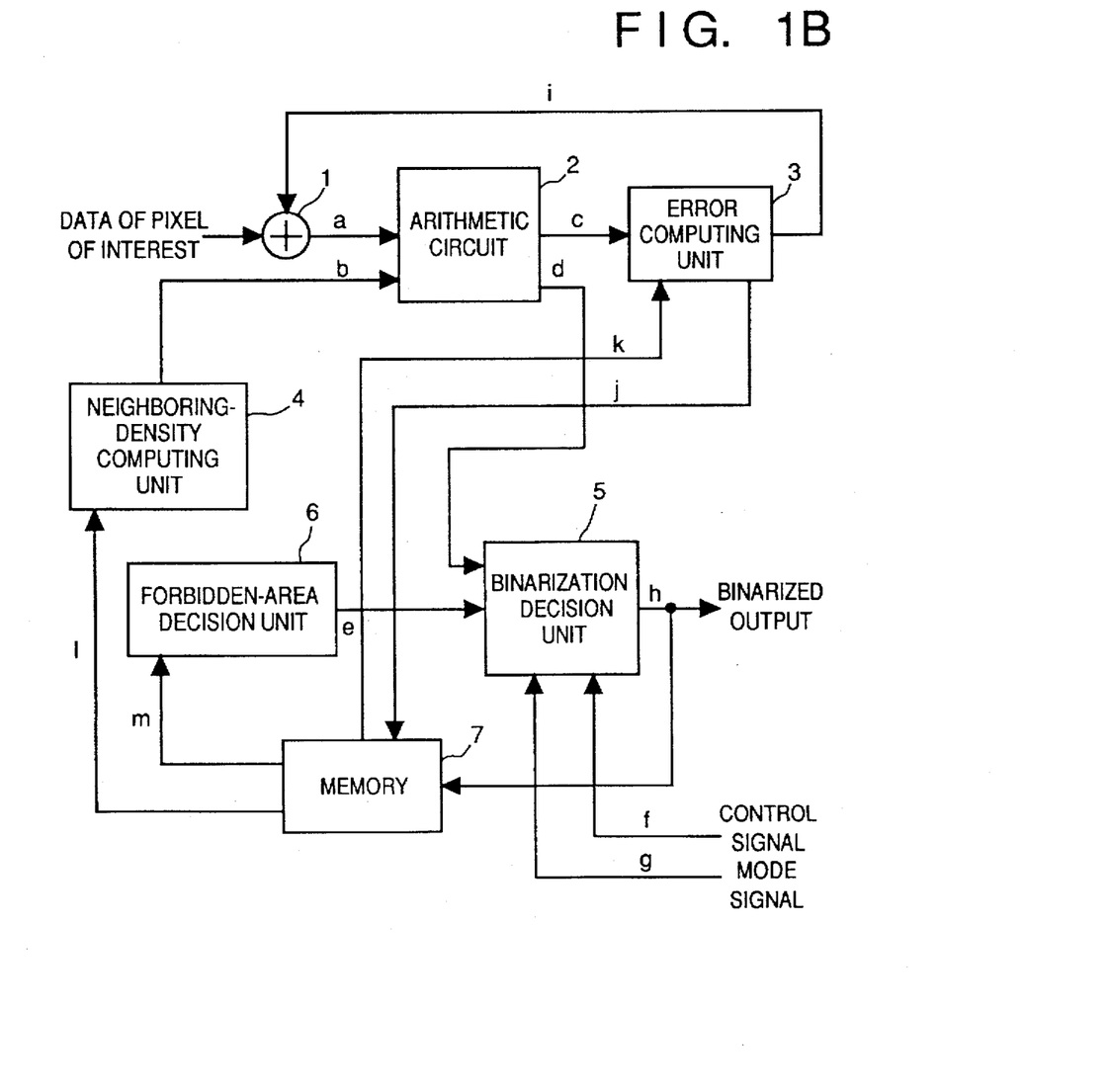

FIGS. 1A and 1B are block diagrams illustrating the construction of a copier having a built-in bubble-jet printer serving as a typical embodiment of the present invention. FIG. 1A illustrates an overview of the overall construction of the apparatus and FIG. 1B shows the constitution of a signal processing unit, which is a characterizing feature of the present invention.

As shown in FIG. 1A, a scanner 100 for reading the image of an original is connected to a signal preprocessor 101, which executes well-known signal processing such as processing for converting an image signal input from the scanner 100 into a multivalued digital image signal (image signal). A signal processor 102 executes signal processing such as processing for providing the image signal with additional information. A printer controller 103 buffers the output signal from the signal processor 102 to control delivery of the signal to a bubble-jet printer 104.

In FIG. 1B, an adder circuit 1 adds the density (multivalued data) of the pixel of interest and the value of a binarization error outputted by an error computing unit 3, described later. An arithmetic circuit 2 receives, as input signals, an output signal a from the adding circuit 1 and an output signal b from a neighboring-density computing unit 4, described later. An output signal c from the arithmetic circuit 2 enters the error computing unit 3, which proceeds to calculate the binarization error and feed back the result to the adder circuit 1 as an output signal i. The neighboring-density computing unit 4 calculates the average density of the area neighboring the pixel of interest based on previously binarized information. A binarization decision unit 5 uses an output signal d from the arithmetic circuit 2 and an output signal e from a forbidden-area decision unit 6, described later, to perform binarization and output a binarized signal h in accordance with a control signal f indicating additional information and a mode signal g indicating an information add-on mode.

The forbidden-area decision unit 6 refers to previously binarized data m, determines whether or not information is to be added onto the pixel of interest and outputs the determination e. A memory 7 stores the binarized signal h outputted by the binarization decision unit 5 and an output signal j from the error computing unit 3. Further, signals k, l, m read out of the memory 7 are fed back to the error computing unit 3, neighboring-density computing unit 4 and forbidden-area decision unit 6, respectively.

[Description of Operation of Recording Head (FIG. 2)]

Figure 2:
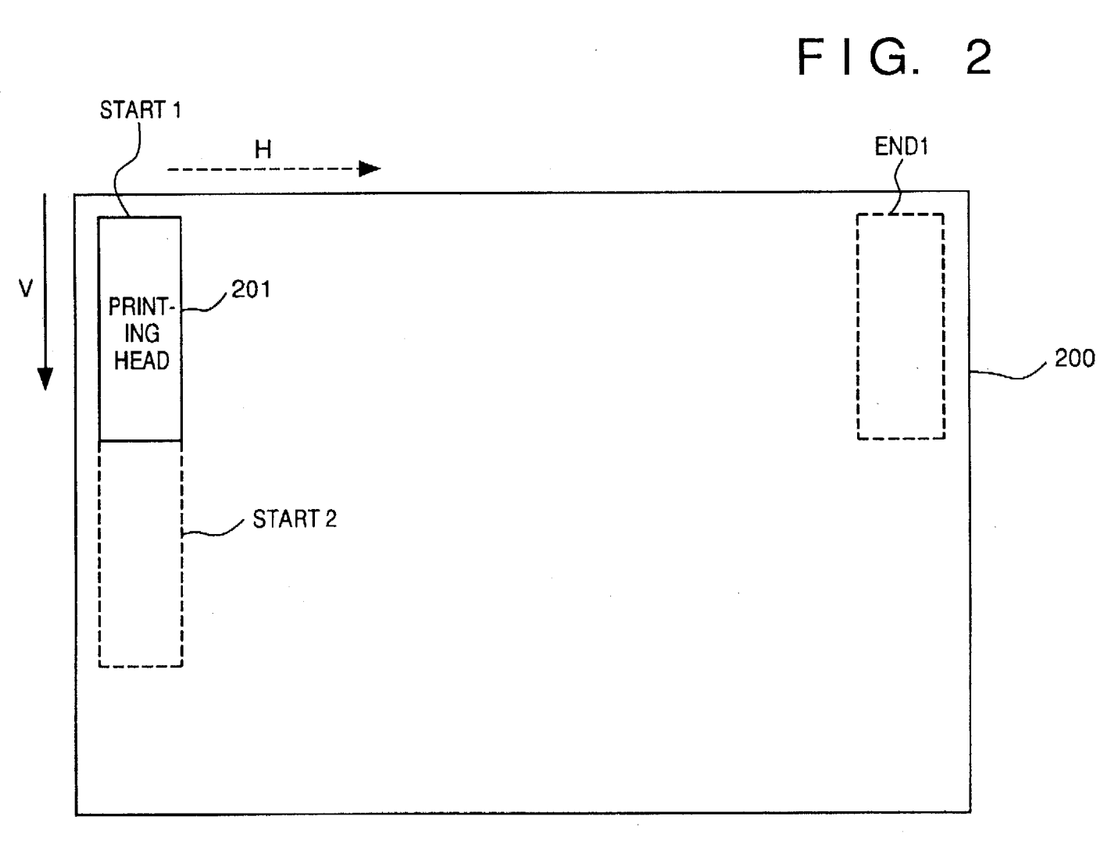
FIG. 2 is a diagram showing the relationship between motion of a printing head 201 in a bubble-jet printing section 104 and formation of an image on a recording paper 200.

FIG. 2 is a diagram showing the relationship between motion of a printing head 201 in a bubble-jet printing section 104 and formation of an image on recording paper 200. In FIG. 2, the character H represents the direction in which the recording head 201 moves and the character V denotes the direction in which the recording paper 200 is transferred. The recording head 201 has 128 nozzles, arranged in the V direction, ejecting for ink droplets in accordance with the binarized output signal h. This makes it possible to form dots for a maximum of 128 pixels in the V direction at one time. According to this embodiment, the nozzles of the recording head are driven to eject ink droplets when the binarized output signal h is at the "H" level.

The sequence through which an image is formed by the recording head will now be described. First, the recording head 201 is situated at a starting position 1 shown in FIG. 2 and dots for a maximum of 128 pixels are formed in the V direction. Next, the recording head 201 is made to scan an amount equivalent to one pixel in the H direction to form dots for the next 128 pixels. This operation is carried out continuously to form dots successively in the H direction. When the recording head 201 reaches an end position 1 in FIG. 2 and finishes forming dots for 128 pixels at this position, the recording paper 200 is transferred by an amount equivalent to 128 pixels, namely the effective length of the recording head 201. At the same time, the recording head 201 is returned to the left edge of the recording paper 200 in FIG. 2. As a result, the recording head 201 comes to be situated at a starting position 2. The above-described process is repeated to form dots in 128-pixel units in the V direction. This process is repeated until the recording head 201 arrives at the lower right end of the recording paper 200 or until a command is issued by the printer controller 103. An image is thus formed on the recording paper 200.

[Description of Operation of Signal Processor 102 (FIGS. 3 and 4)]

The operation of the signal processor 102 constructed as set forth above will now be described in detail.

Multivalued data of a pixel of interest to undergo binarization enters the adder circuit 1 from the scanner 100. Next, the adder circuit 1 adds the multivalued data of the pixel of interest to the binarization error i, which is produced from an already binarized pixel, outputted by the error computing unit 3, and inputs the resulting sum a to the arithmetic circuit 2. Also fed into the arithmetic circuit 2 is the average density b of the neighboring area calculated by the neighboring-density computing unit 4 on the basis of the binarized signal 1, which is indicative of the neighboring pixels of the pixel of interest, read out of the memory 7.

Figure 3:
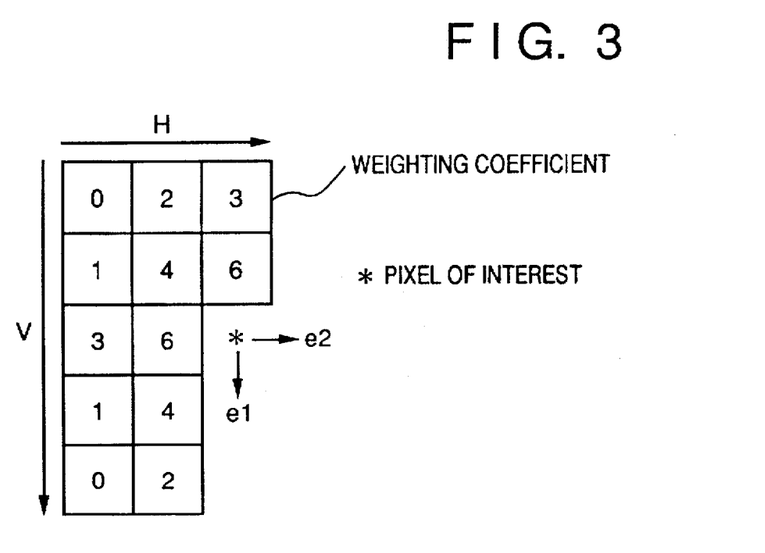
FIG. 3 is a diagram for defining a neighboring area referred to by a neighboring-density arithmetic unit 4.

FIG. 3 is a diagram for defining a neighboring area referred to by the neighboring-density computing unit 4. As shown in FIG. 3, the neighboring-density computing unit 4 calculates, on the basis of the indicated weighting coefficients, the average density of an area of 12 already binarized pixels neighboring the pixel of interest (indicated by "*"). The average density calculated is outputted to the arithmetic circuit 2. Though the weighting coefficients shown in FIG. 3 illustrate an example for a case in which the input multivalued signal (five-bit data) takes on values of from 0 to 31, the signal can also take on other values. In FIG. 3, the directions of V and H correspond to the scanning directions of the recording head 201 shown in FIG. 2.

The arithmetic circuit 2 operates upon the output signal a from the adder circuit 1 and the output signal b from the neighboring-density computing unit 4 to perform the operation c=a−b and delivers the result c to the error computing unit 3. If $c \geq 0$ holds, then the arithmetic circuit 2 delivers the "L" level to the binarization decision unit 5 as the control signal d of the arithmetic result c. If c<0 holds, on the other hand, then the arithmetic circuit 2 delivers the "H" level to the binarization decision unit 5 as the control signal d of the arithmetic result c.

As for the binarizing technique according to this embodiment, binarization of the pixel of interest is carried out using the average density of the neighboring area as the threshold value, and the error produced is distributed to neighboring pixels that are to undergo binarization subsequently, whereby binarization of the input multivalued data is performed while the average density is preserved. In FIG. 3, e1 and e2 are computed as set forth below from the error c generated with regard to the pixel of interest and respectively represent the error added to the subsequent pixel binarized in the V direction and the error added to the pixel to be binarized on the subsequent line owing to movement of the recording head in the H direction.

e1=c/2, e2=c−e1

The error computing unit 3 writes the computed error e2 in the memory 7 as the signal j, reads an error e2', which has been generated at the time of binarization on the preceding line, out of the memory 7 as the signal k and outputs the sum i (i=e1+e2') of this value and the above-mentioned error e1 to the adder circuit 1. In other words, the error added to the multivalued data of the pixel of interest by the adder circuit 1 is the sum of the error e1 generated from the immediately preceding pixel and the error e2' generated from the pixel on the immediately preceding line.

The forbidden-area decision unit 6 goes to the memory 7 to read out binarized data of the area in which the neighboring pixels of the pixel of interest has already been binarized and detects the density of the surroundings of the pixel of interest. The directions of V and H in FIG. 4 correspond to the scanning directions of the recording head 201 shown in FIG. 2. Here reference is made to the binarized data of five pixels neighboring the pixel of interest. An "L" level signal is outputted in a case where there is no "H"-level binarized data in this area, and an "H"-level signal is outputted in a case where there is "H"-level binarized data in this area. The signal e thus obtained and outputted from the forbidden-area decision unit 6 indicates whether the density of the area neighboring the pixel of interest is lower than a predetermined value.

[Description of Operation of Binarization Decision Unit 5 (FIGS. 5~7B)]

Figure 5:
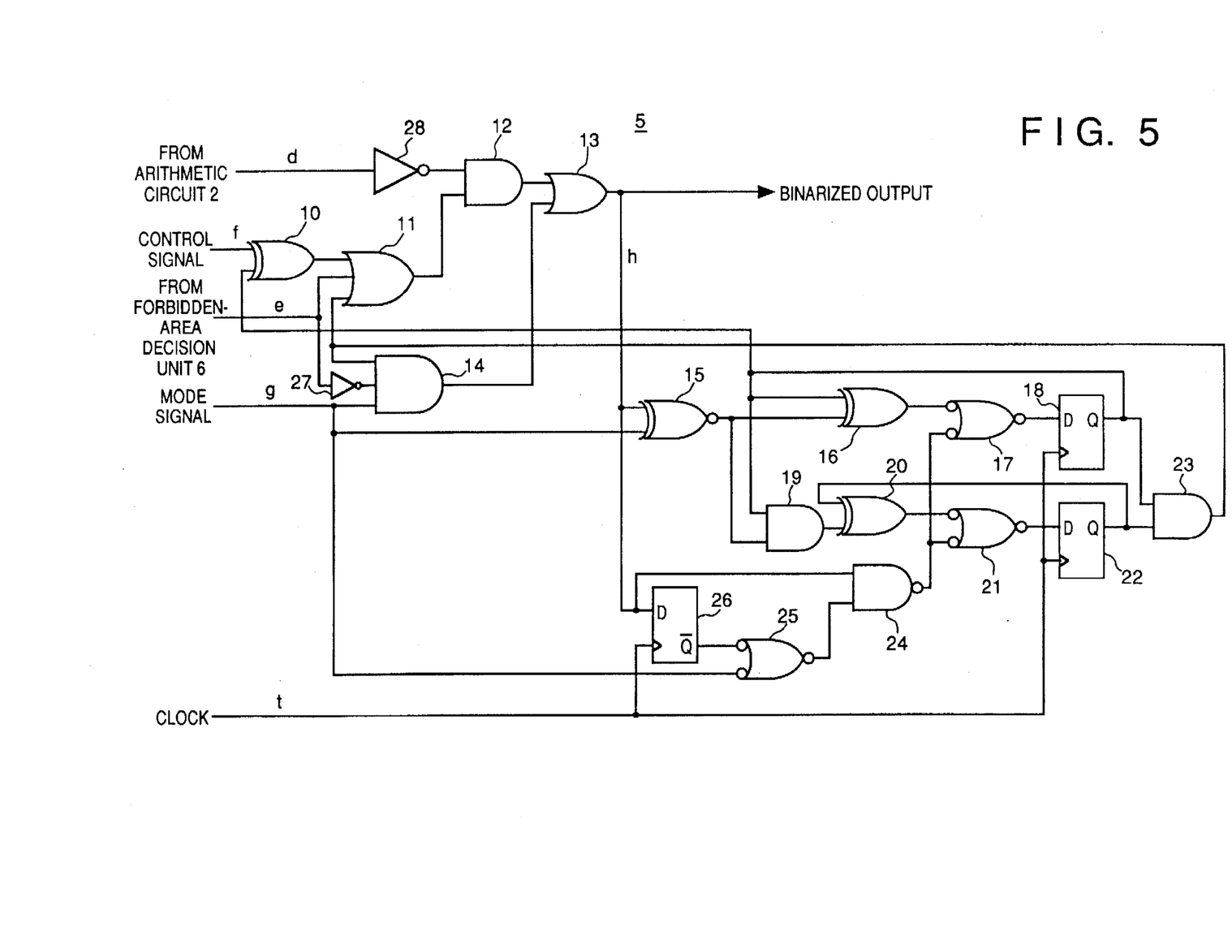
FIG. 5 is a circuit diagram showing the detailed construction of a binarization decision unit 5.

FIG. 5 is a circuit diagram showing the detailed construction of the binarization decision unit 5. Signals identical with those described in connection with FIG. 1B are designated by like reference characters in FIG. 5. As shown in FIG. 5, the control signal f indicating additional information and an output signal from a flip-flop (hereinafter referred to as an "F.F.") 18 constructing a counter (described later) enter an exclusive-OR gate (hereinafter referred to as an "EXOR" gate) 10. The output of the EXOR gate 10, the output signal e of the forbidden-area decision unit 6 and the =output signal of an AND gate 23 enter an OR gate 11. The output signal d from the arithmetic circuit 2 is inverted by an inverter 28, and the inverted signal and the output signal from the OR gate 11 enter an AND gate 12. The output signal from the AND gate 12 and the output signal of an AND gate 14 enter an OR gate 13. The output signal d of the forbidden-area decision unit 6 is inverted by an inverter 27, and the inverted signal, the mode signal g and the output signal of the AND gate 23 enter the AND gate 14.

As shown in FIG. 5, the output signal of the OR gate 13 is the binarized output signal h. This signal is outputted to the printer controller 103 and is delivered also to the memory 7, where the signal is stored.

The mode signal g and the binarized output signal h enter an exclusive-NOR gate (hereinafter referred to as an "EXNOR" gate) 15. The circuitry further includes EXOR gates 16, 20, AND gates 17, 19, 21, F.F.s 18, 22, 26 and NAND gates 24, 25. Further, t represents a clock signal synchronized to the input multivalued data described in FIGS. 1A and 1B. The components 16~22 construct a two-bit counter which delivers the Q outputs of the F.F.s 18, 22 as the counter output. The counter performs a count-up operation in sync with the clock signal t when the output signal of the EXNOR gate 15 is at the "H" level.

When the binarized output signal h is at the "H" level continuously at such time that the mode signal g is at the "H" level, both inputs to the NAND gate 24 are at the "H" level. As a result, the F.F. 26 and the NAND gates 24, 25 cooperate to output the "L" level. The Q outputs of the F.F.s 18, 22, which are the outputs of the above-mentioned two-bit counter, are set to the "L" level via the AND gates 17, 21 at the timing of the next clock signal pulse t. On the other hand, when the binarized output signal h is at the "H" level at such time that the mode signal g is at the "L" level, the output signal of the NAND gate 24 assumes the "L" level and the Q outputs of the F.F.s 18, 22 are set to the "L" level. Furthermore, when the F.F.s 18, 22 constituting the counter outputs are both at the "H" level, the AND gate 23 outputs the "H" level to the OR gate 11 and AND gate 14.

The details of operation of the binarization decision unit 5 will now be described for a case in which the mode signal S is at the "H" level. As set forth earlier, the signal d indicating the results of the arithmetic operation from the arithmetic circuit 2 enters the AND gate 12 upon being inverted by the inverter 28.

If the signal e outputted by the forbidden-area decision unit 6 is at the "H" level, then the output signal from the OR gate 11 assumes the "H" level so that the level of the output signal of the inverter 28 is delivered as is at the output of the AND gate 12. When the output signal of the AND gate 12 is at the "H" level, the output of the OR gate 13 also is at the "H" level and the "H" level is delivered as the binarized output. That is, the binarized output is at the "H" level in a case where the output signal c of the arithmetic circuit satisfies the condition $c \geq 0$. On the other hand, if the output signal c of the arithmetic circuit 2 satisfies the condition $c < 0$, then the output signal of the AND gate 12 assumes the "L" level. Therefore, the binarized output signal h, which is the output of the OR gate 13, attains the "H" level when the output signal from the AND gate 14 is "H" and assumes the "L" level when the output signal from the AND gate 14 is "L".

Figure 4:
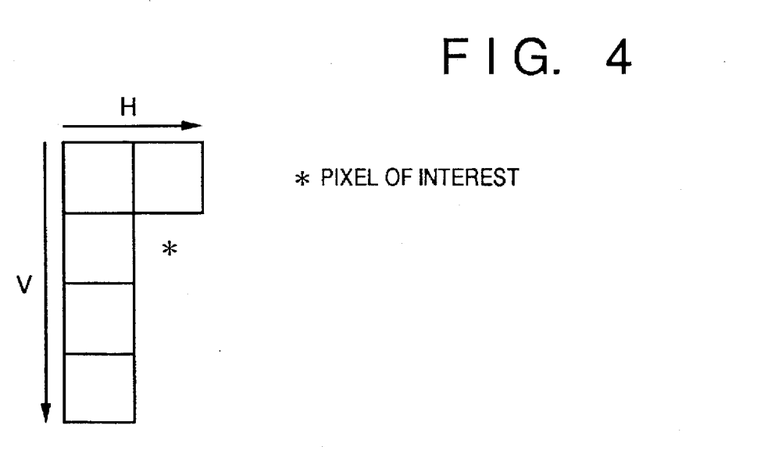
FIG. 4 is a diagram showing a neighboring area referred to by a forbidden-area decision unit 6.
Figure 6:
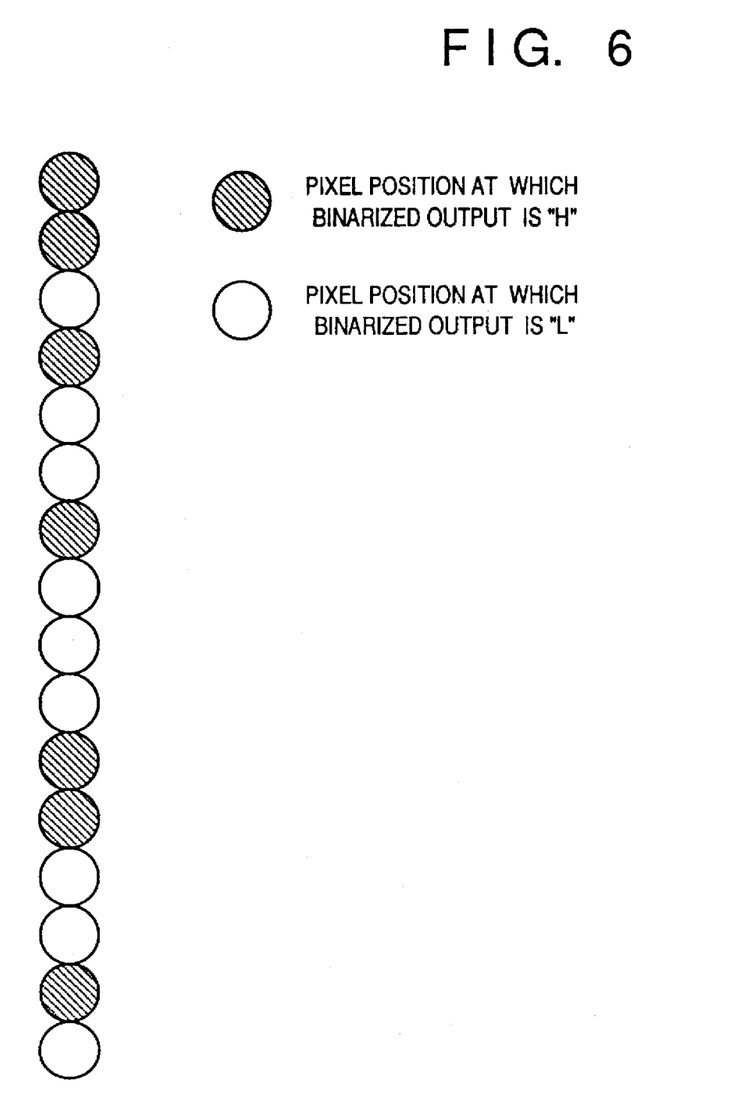
FIG. 6 is a diagram showing an example of output of binarized output signal h.

The output signal of the AND gate 14 attains the "H" level when the output signal e from the forbidden-area decision unit 6 is "L", namely when there is no "H" level in the binarized output signal of the area shown in FIG. 4 and, moreover, the output signal of the AND gate 23 is "H". The binarized output signal h is brought to the "H" level forcibly irrespective of the output at the AND gate 12. This is when the F.F.s 18 and 22 constituting the counter outputs are both at the "H" level, namely when a non-continuous "H" level in the binarized output signal h is counted three times. FIG. 6 illustrates the condition of the binarized output signal h at this time.

Since a two-bit counter is used as the counter which counts the "H" level of the binarized output h, output is controlled in such a manner that two successive "H" levels appear between two non-continuous "H" levels in the binarized output signal h. However, it is obvious that by changing the count of the counter, the successive "H" levels of the binarized output signal h that are outputted every certain number of non-continuous "H" levels in the binarized output signal h can be changed at will.

Thus, the binarized output signal is brought to the "H" level forcibly by the output of the AND gate 14 even if the output of the AND gate 12 is at the "L" level. This binarized output signal is stored in the memory 7 and is used when a pixel corresponding to a subsequently inputted image signal is binarized. More specifically, the neighboring-density computing unit 4 reads the binarized output signal out of the memory 7 to decide the threshold value of binarization. As a result, binarization in which the density of the input pixel is preserved is carried out.

In a case where the output signal e of the forbidden-area decision unit 6 indicates that the neighboring area is devoid of an "H" level for the binarized output (i.e., in a case where the signal e is at the "L" level), the binarized output signal assumes the "H" level. In other words, the binarized output signal assumes the "H" level only with regard to a comparatively low-density area. As a consequence, almost no disturbance is caused in the binarized output.

Operation will now be described for a case in which the mode signal g applied to the binarization decision unit 5 is at the "L" level.

At this time the output of the AND gate 14 is at the "L" level so that the output signal of the AND gate 12 is reflected as is in the value of the binarized output signal h. The count-up operation performed by the two-bit counter constructed by the components 16–22 is carried out when the binarized output signal h is at the "L" level since the mode signal g at the "L" level and the binarized output signal h enter the EXNOR gate 15. Owing to the NAND gate 24 and the AND gates 17, 21, the outputs of the F.F.s 18, 22, which are the counter outputs, assume the "L" level when the binarized output signal h is at the "H" level.

Since the output of the F.F. 18 and the control signal f enter the EXOR gate 10, the output of the latter assumes the "L" level when the output of the F.F. 18 and the control signal f are both "H" or "L". Furthermore, if the output signal e of the forbidden-area decision unit 6 is at the "L" level at this time, the output signal of the OR gate 11 assumes the "L" level and the output signal of the AND gate 12 is brought to the "L" level forcibly.

Figure 7A:
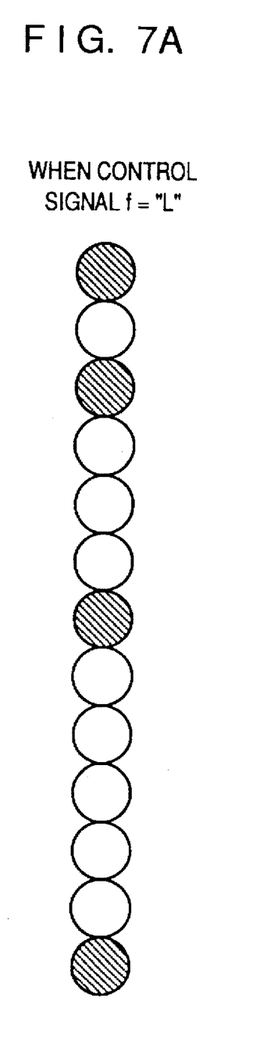
FIGS. 7A and 7B are diagrams showing the manner in which the spacing between "H" levels of the binarized output signal is controlled to be an odd or even number of pixels in accordance with the level of a control signal f.
Figure 7B:
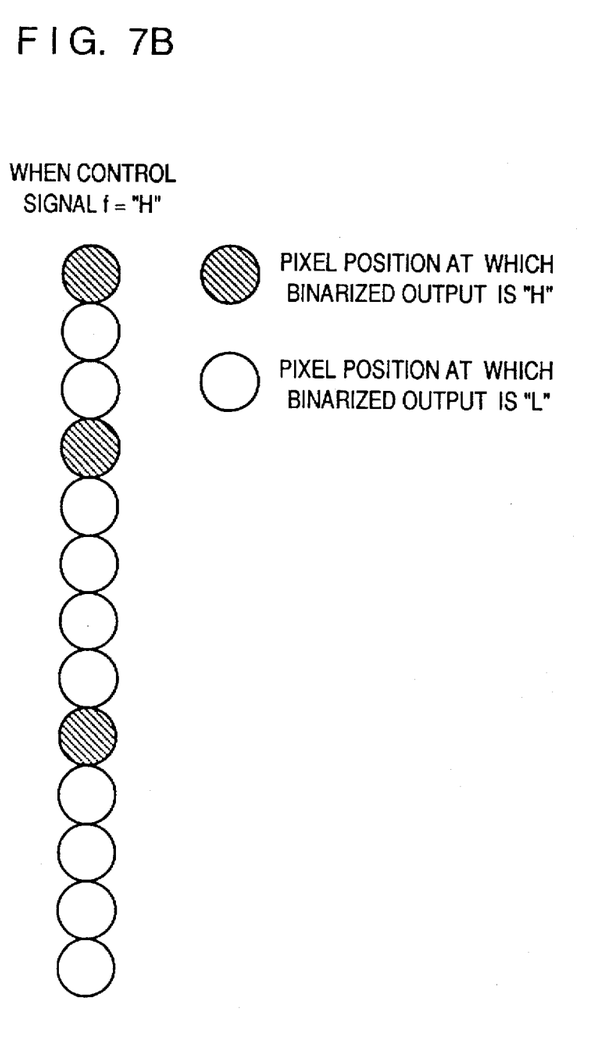

Thus, the spacing between the "H" levels in the binarized output signal h is controlled so as to be an even number or an odd number in accordance with the level of the control signal f. This is illustrated in FIGS. 7A and 7B.

When the spacing between the "H" levels of the binarized output signal is an even number (0, 2, 4, . . . ), i.e., when the output of the F.F. 18 is "L", at such time that the control signal f is at the "L" level, the binarized output signal is forced to assume the "L" level. As a result, the disposition of the pixels becomes as shown in FIG. 7A. On the other hand, when the spacing between the "H" levels of the binarized output signal is an odd number (1, 3, 5, . . . ) at such time that the control signal f is at the "H" level, the binarized output signal is forced to assume the "L" level. As a result, the disposition of the pixels becomes as shown in FIG. 7B. It should be noted that forcing the binarized output signal h to the "L" level by the output signal of the OR gate 11 is performed only when the output signal e of the forbidden-area decision unit 6 is at the "L" level. Hence, this control is executed only with regard to an area in which the image density is comparative low. Accordingly, there is almost no disturbance produced in the binarized output.

As in the case where the mode signal g is at the "H" level, the binarized output signal is stored in the memory 7 and is used when a pixel corresponding to a subsequently inputted image signal is binarized. More specifically, the neighboring-density computing unit 4 reads the binarized output signal out of the memory 7 to decide the threshold value of binarization. As a result, binarization in which the density of the input pixel is preserved is carried out.

In a case where the output signal of the OR gate 11 is at the "L" level and the output of the AND gate 12 is forced to assume the "L" level regardless of the fact that the output level of the inverter 28 is at the "H" level, the output of the F.F. 18 undergoes a change in value when binarization of the subsequent pixel is performed. Accordingly, if the level of the control signal f is not changed, the output signal of the EXOR gate 10 attains the "H" level and the output level of the inverter 28 becomes the binarized output. Owing to the fact that the preceding pixel has been made the "L" level, the binarization threshold value calculated by the neighboring-density computing unit 4 is lowered. As a consequence, the signal c outputted by the arithmetic circuit 2 satisfies the relation $c \geq 0$ and there is a higher probability that the signal d will take on the "L" level. This means that there is a higher probability that the binarized output signal h will take on the "H" level.

[Adding on of Information]

The manner in which information is actually added on will now be described.

The adding on of information is performed in such a manner that one bit of data will appear on one line in the V direction illustrated in FIG. 2. Information add-on is carried out in such a manner that the same data will be indicated by a dot pattern, in which 128 pixels serve as the basic unit, with regard to the same line in the V direction.

The data added on is indicated by the level of the control signal f when the mode signal g is at the "L" level, and use is made of the fact that the spacing of the "H" levels of the binarized output signal is controlled to be an odd or even number. If the spacing of the "H" levels of the binarized output is an odd number of pixels, this indicates additional data "0". If the spacing is an even number, this indicates additional data "1" The data thus added on is data expressed by a plurality of bits of a manufacturing serial number or product code or the like for specifying the model of the copier. This information is expressed by a plurality of lines with regard to the H direction. When the mode signal g is at the "H" level, a pattern in which the binarized output attains the "H" level successively for two pixels appears regularly in the recorded pattern, as depicted in FIG. 6. This is used in order to indicate the line at which data add-on starts.

The additional data is the same the same line with regard to the V direction. Therefore, even if there is a pixel for which the adding on of information is forbidden by the output signal e from the forbidden-area decision unit 6, discrimination of the additional information can be performed with ease by taking a majority decision with regard to dot patterns of a plurality of pixels formed on the same line.

Thus, in accordance with this embodiment, information such as the manufacturing serial number or product code of a copier is added on to an output image, without causing almost any disturbance in the binarized output in a low-density area, while the density of the input pixel is preserved and binarization is performed.

<Second Embodiment>

[Description of Operation of Signal Processor 102 (FIG. 8)]

Figure 8:
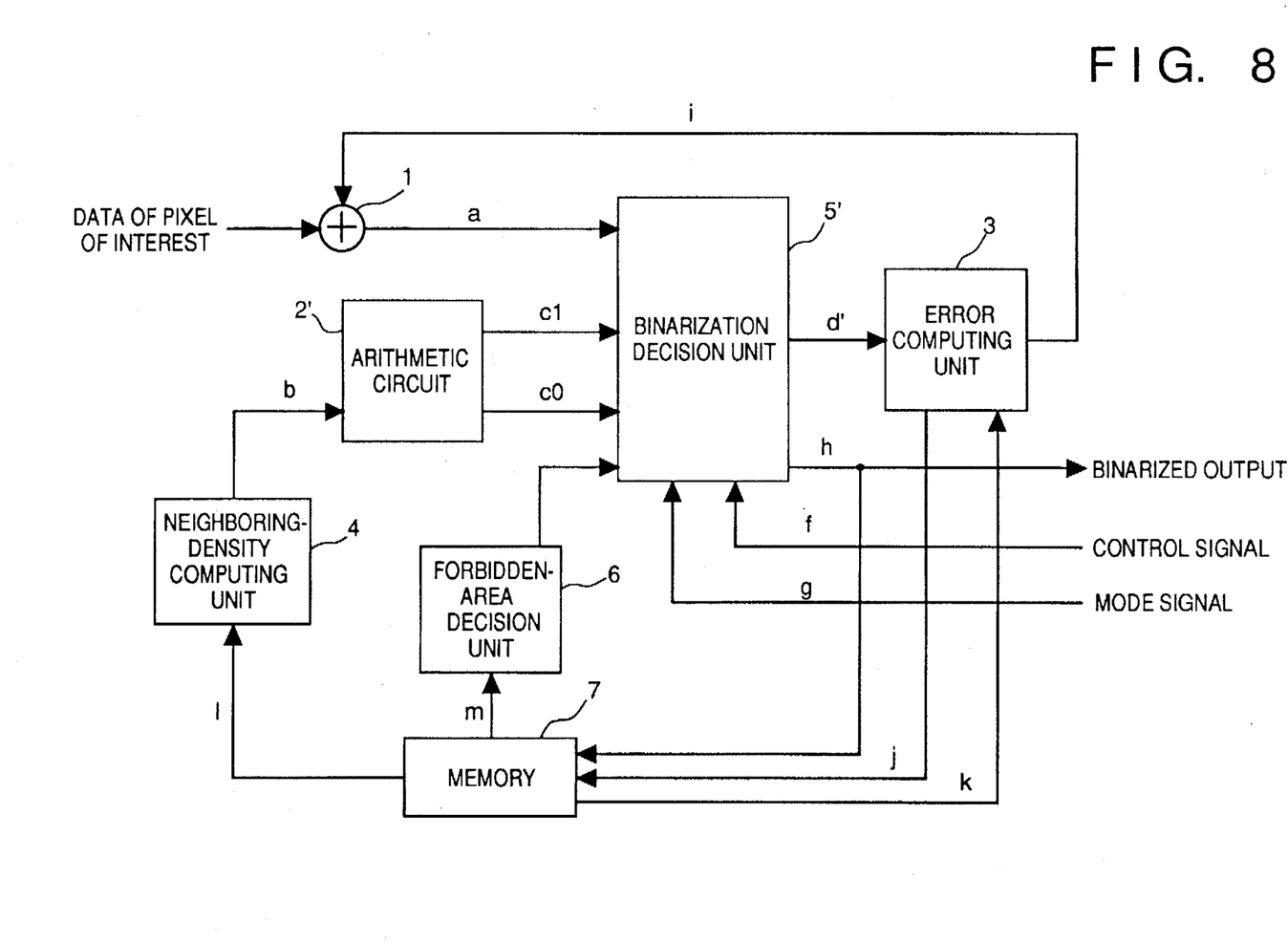
FIG. 8 is a block diagram showing the construction of a signal processor in accordance with a second embodiment of the invention.

FIG. 8 is a block diagram showing the construction of a signal processor according to this embodiment. Structural components and signals in FIG. 8 identical with those illustrated in the first embodiment are designated by like reference characters and need not be described again. The elements and signals that characterize this embodiment will now be described.

In FIG. 8, the output signal b of the neighboring-density computing unit 4 enters an arithmetic circuit 2', which subjects the signal b to processing. The output signal a of the adder circuit 1, output signals c0, c1 of the arithmetic circuit 2', the output signal e of the forbidden-area decision unit 6, the control signal f and the mode signal g enter a binarization decision unit 5', which outputs a signal d' and the binarized signal h. The output signal d of the binarization decision unit 5' enters the error computing 3, which calculates the error and outputs the result to the adder circuit 1 as the signal i and to the memory 7 as the signal j.

The operation characterizing the signal processor according to this embodiment will now be described in detail.

The adder circuit 1 adds the multivalued data of the pixel of interest to the signal i indicative of the binarization error, which is produced from an already binarized pixel, outputted by the error computing unit 3, and inputs the resulting sum a to the binarization decision unit 5'. With regard to the output signal b from the neighboring-density computing unit 4, the arithmetic circuit 2' calculates average density c1 for a case in which the pixel of interest has been binarized to "1" and average density c0 for a case in which the pixel of interest has been binarized to "0" and delivers these density values to the binarization decision unit 5'.

If the weighting coefficient for the pixel of interest is made "7", then the values of c1 and c0 are as follows:

c1=b+7×1, c0=b+7×0=b

[Description of Operation of Binarization Decision Unit 5' (FIGS. 9~10C)]

The operation of the binarization decision unit 5' will now be described.

Figure 9:
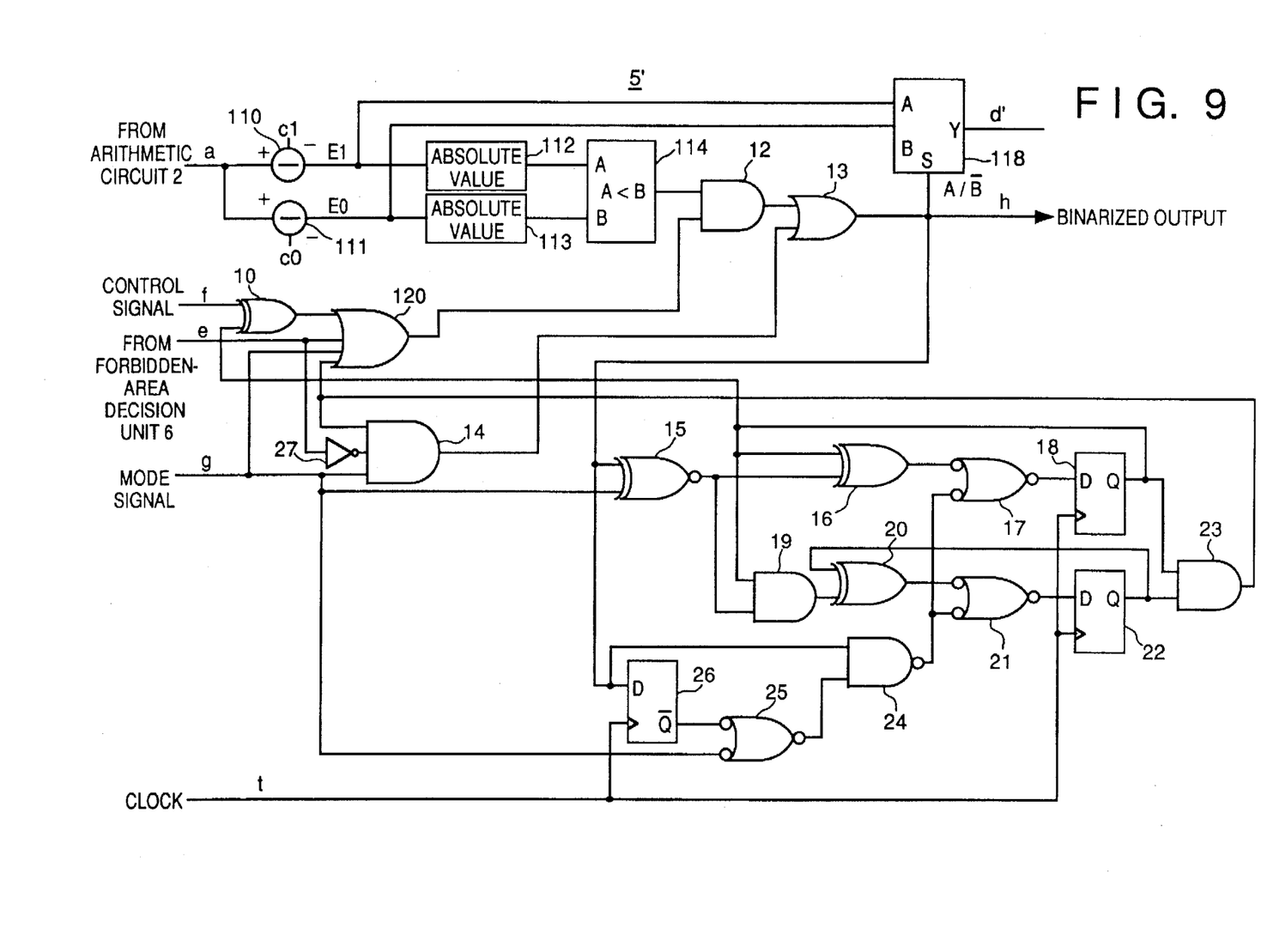
FIG. 9 is a block diagram showing the detailed construction of a binarization decision unit 5.

FIG. 9 is a block diagram showing the detailed construction of the binarization decision unit 5'. Structural elements and signals in FIG. 9 identical with those of the first embodiment and already described in connection with FIG. 8 are designated by like reference characters and need not be described again.

As shown in FIG. 9, subtractor circuits 110, 111 respectively subtract the output signals c1, c0, which are outputted by the arithmetic circuit 2', from the output signal a of the adder circuit 1. The subtractor circuit 110 outputs E1 (=a−c1) and the subtractor circuit 111 outputs E0 (=a−c1). Absolute-value circuits 112, 113 output the absolute values of the input signals E1, E0, respectively. A two-input comparator 114 has input terminals A and B to which |E1| and |E2| are applied, respectively, and outputs "1" when A<B holds and "0" when A≧0 holds. A selector 118 has input terminals A, B and S and an output terminal Y. The binarized output signal h of the OR gate 13 enters the input terminal S. The selector 118 outputs the signal E1, which is being applied to the input terminal A, when the value of the binarized output signal h is at the "H" level, and outputs the signal E0, which is being applied to the input terminal B, when the value of the binarized output signal h is at the "L" level. The output signal delivered from the output terminal Y is the output signal d' of the binarization decision unit 5'.

The output of the EXOR gate 10, the output signal e of the forbidden-area decision unit 6, the mode signal g and the output signal of the AND gate 23 enter an OR gate 120.

The AND gate 12 and the OR gate 13 function as gates for forcibly sending the binarized output signal h to the "L" or "H" level. This will be described in detail.

A case in which the mode signal g is at the "H" level will be described first. According to the binarization technique of this embodiment, the average density of an area containing the pixel of interest is calculated for a case in which the pixel of interest is binarized to the "H" level and a case in which the pixel of interest is binarized to the "L" level, the values of average density are respectively compared with an input value that has been corrected for binarization error, a binarized output is decided so as to obtain an average density close to the input value, the difference between the average density and the input value is adopted as binarization error and distributed to the neighboring pixels, whereby binarization of the multivalued data is performed while density is preserved. This is shown in FIGS. 10A to 10C.

Figure 10A:
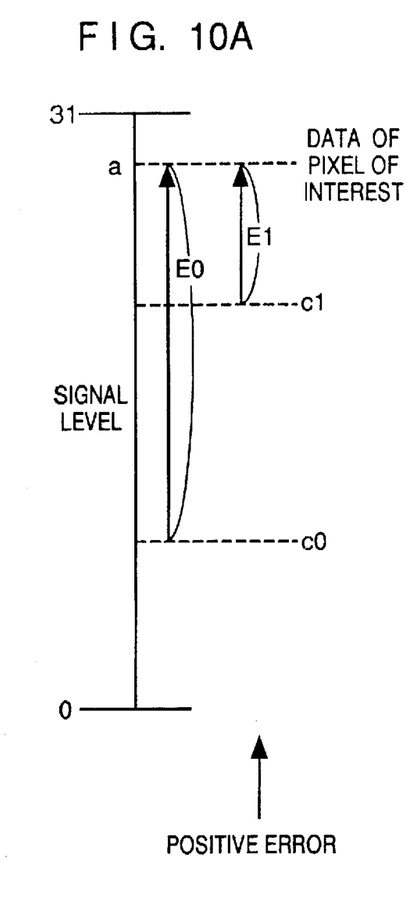
FIGS. 10A to 10C are diagrams showing the manner in which binarization of multivalued data is performed while preserving density by allocating the difference between average density and an input value to neighboring pixels as a binarization error.
Figure 10B:
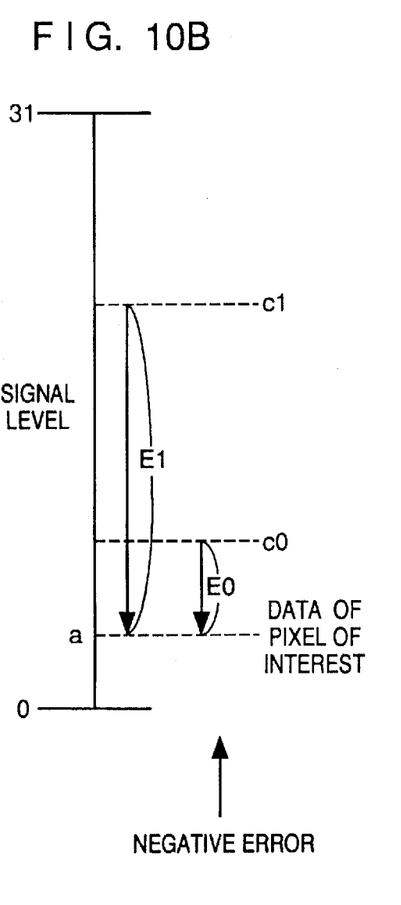
Figure 10C:
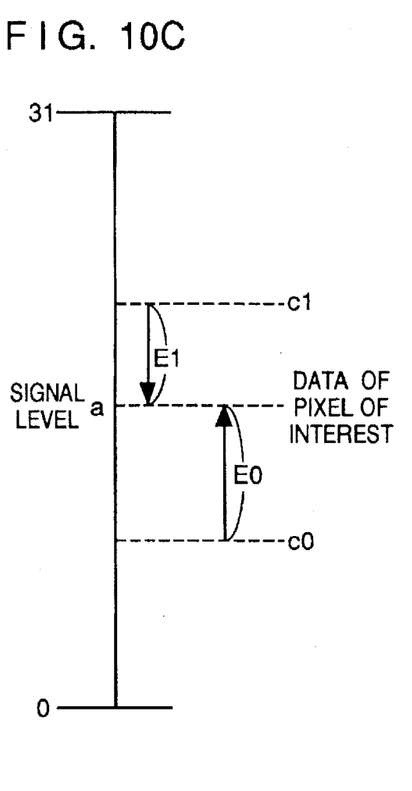

A signal level a shown in FIGS. 10A to 10C represents a signal level corresponding to an output signal a, which is the result of adding data indicative of the pixel of interest outputted by the adder circuit 1 of FIG. 1B and the binarization error outputted by the error computing unit 3. Further, c1 and c0 respectively represent the level of average density c1 for a case in which the pixel of interest outputted by the arithmetic circuit 2' is binarized to "1" and a case in which the pixel of interest is binarized to "0" Furthermore, E1 and E0 indicate the binarization errors produced. These correspond to the outputs of the subtractors 110 and 111, respectively, illustrated in FIG. 9. In a case where |E1|<|E0| holds, the output of the comparator 114 attains the "H" level, which enters the AND gate 12, as mentioned above. Since the mode signal g is at the "H" level, the output signal of the OR gate 120 attains the "H" level. Accordingly, in this case the output of the AND gate 12 attains the "H" level, as a result of which the binarized output signal h, which is the output of the OR gate 13, also attains the "H" level.

The binarized output signal h enters the select terminal of the selector 118 to control the selector. If the binarized output signal h is at the "H" level, the signal E1 becomes the output d'. This enters the error computing unit 3 as the binarization error. If |E1|≧|E0| holds, the output of the comparator 114 attains the "L" level, as a result of which the output signal of the AND gate 12 assumes the "L" level. In this case, the binarized output signal h at the output of the OR gate 13 attains the "H" level when the output of the AND gate 14 is "H" and assumes the "L" level when the output of the AND gate 14 is "L". The output signal of the AND gate 14 attains the "H" level when the output signal e of the forbidden-area decision unit 6 is "L" and, moreover, the output signal of the AND gate 23 is at the "H" level. At this time the binarized output signal h is forced to the "H" level.

The signal e outputted by the forbidden-area decision unit 6 indicates whether or not the density of the area neighboring the pixel of interest is lower than a predetermined value, as already described. Accordingly, the output signal of the AND gate 14 attains the "H" level when the signal e outputted by the forbidden-area decision unit 6 is at the "L" level, namely when the density of the area neighboring the pixel of interest is lower than the predetermined value and the output of the AND gate 23 is at the "H" level. On the other hand, the output signal of the AND gate 23 attains the "H" level when the counter outputs of F.F.s 18 and 22 both attain the "H" level, namely when a non-continuous "H" level in the binarized output signal h has been counted three times.

Thus, when the output signal of the AND gate 14 attains the "H" level, the binarized output signal h is forcibly raised to the "H" level and the output (the binarization error signal d') of the selector 118 becomes the signal E1. The condition of the binarized output signal h is the same as that of the first embodiment, as illustrated in FIG. 6. Accordingly, the binarized output signal attains the "H" level in a case where the "H" level of the binarized output is not present in the neighboring area. That is, the binarized output signal attains the "H" level only with regard to an area of comparatively low density, just as in the first embodiment. As a result, there is almost no disturbance in the binarized output.

The binarization error signal d' selected by the selector 118 in accordance with the binarized output signal h and fed into the error computing unit 3 is distributed to the neighboring pixels as e1, e2, as illustrated in FIG. 3. Here we have e1=d/2, e2=d−e1

The meanings of e1, e2 are the same as in the first embodiment.

As described above, the forcible raising of the binarized output signal h to the "H" level by the output of the AND gate 14 is limited to a case in which the output signal e of the forbidden-area decision unit 6 assumes the "L" level. Accordingly, such control is executed only with respect to a comparatively low-density region of an image, and therefore the result is that the binarized output undergoes almost no disturbance. Further, the binarized output signal h is stored in the memory 7 and is used by the neighboring-density computing unit 4 when a subsequently entered pixel is binarized, and the subsequent binarized output value is decided by the value of this signal. Hence, binarization in which the density of the input pixel is preserved is carried out.

In a case where the binarized output signal h is forcibly raised to the "H" level regardless of the fact that the output level of the comparator 14 is the "L" level, the binarized output signal d' becomes E1. In this case, |E1|≧|E0| holds and a negative error signal is obtained, as shown in FIG. 10B. With regard to a pixel subjected to binarization following this pixel, the output signal of the AND gate 23 assumes the "L" level and so does output signal of the AND gate 25 owing to a change in the outputs of F.F.s 18, 22. As a result, the output level of the comparator 14 remains the binarized output signal h. At this time the error signal e1 distributed from the preceding pixel is a comparatively large negative value. Furthermore, the binarized output signal h of the preceding pixel is at the "H" level. Hence, the average density b of the neighboring area computed by the neighboring-density computing unit 4 possesses a higher value and the outputs c1, c0 from the arithmetic circuit 2' also possess high values. Accordingly, the probability that |E0|>|E1| will hold is raised and so is the probability that the binarized output signal h will assume the "L" level.

Operation when the mode signal g is at the "L" level will now be described. Since the output of the AND gate 14 is at the "L" level, the output signal from the AND gate 16 remains the binarized output signal h. Further, since the binarized output signal h enters the aforementioned two-bit counter via the EXNOR gate 15, the count-up operation is carried out with regard to pixels for which the binarized output signal h is at the "L" level. Owing to the NAND gates 24, 25 and the AND gates 17, 21, the outputs of the F.F.s 18, 22, which are the counter outputs, are set to the "L" level when the binarized output signal h is at the "H" level.

Since the output of the F.F. 18 and the control signal f enter the EXOR gate 10, the output of the latter assumes the "L" level when the levels of the F.F. 18 and control signal f are both "H" or "L". If the output signal e of the forbidden-area decision unit 6 is at the "L" level at this time, the output signal of the OR gate 120 assumes the "L" level and the output signal of the AND gate 12 is brought to the "L" level forcibly.

Thus, the spacing between the "H" levels in the binarized output signal h is controlled so as to be an even number or an odd number in accordance with the level of the control signal f. This is illustrated in FIGS. 7A and 7B. It should be noted that forcing the binarized output signal h to the "L" level by the output signal of the OR gate 120 is performed only when the output signal e of the forbidden-area decision unit 6 is at the "L" level. Hence, this control is executed only with regard to an area in which the image density is comparative low. Accordingly, there is almost no disturbance produced in the binarized output.

The binarized output signal h is stored in the memory 7 and is used by the neighboring-density computing unit 4 when a subsequently inputted pixel is binarized, and the subsequent binarized output value is decided by the value of this signal. Hence, binarization in which the overall density of the input pixel is preserved is carried out.

In a case where the binarized output signal h is forcibly lowered to the "L" level regardless of the fact that the output level of the comparator 14 is the "H" level, the binarized output signal d' becomes E0. In this case, |E0|>|E1| holds and the binarization error signal d' in this case becomes a positive error signal, as shown in FIG. 10A. With regard to a pixel subjected to binarization following this pixel, the output signal of the EXOR gate 10 assumes the "H" level and so does output signal of the OR gate 120 owing to a change in the output of F.F. 18. As a result, the output level of the comparator 114 remains the binarized output signal h. Meanwhile the error signal e1 distributed from the preceding pixel is a comparatively large positive value. Furthermore, the binarized output signal h of the preceding pixel is at the "L" level. Hence, the average density b of the neighboring area computed by the neighboring-density computing unit 4 takes on a low value. Consequently, the values of the outputs c1, c0 from the arithmetic circuit 2' also take on lower values and the probability that |E1|<|E0| rises. Accordingly, the probability that the binarized output signal h will assume the "H" level rises.

Thus, in accordance with this embodiment, information such as the manufacturing serial number or product code of a copier is added on to an output image, without causing almost any disturbance in the binarized output in a low-density area, while the density of the input pixel is preserved and binarization is performed.

It goes without saying that a binarization technique other than that described in this embodiment can be applied to the present invention. For example, the error-diffusion method may be used as the binarization method. In the error-diffusion method, input data indicative of the pixel of interest is corrected based upon the binarization error generated from an already binarized pixel, after which binarization is carried out at a predetermined threshold value.

Figure 11A:
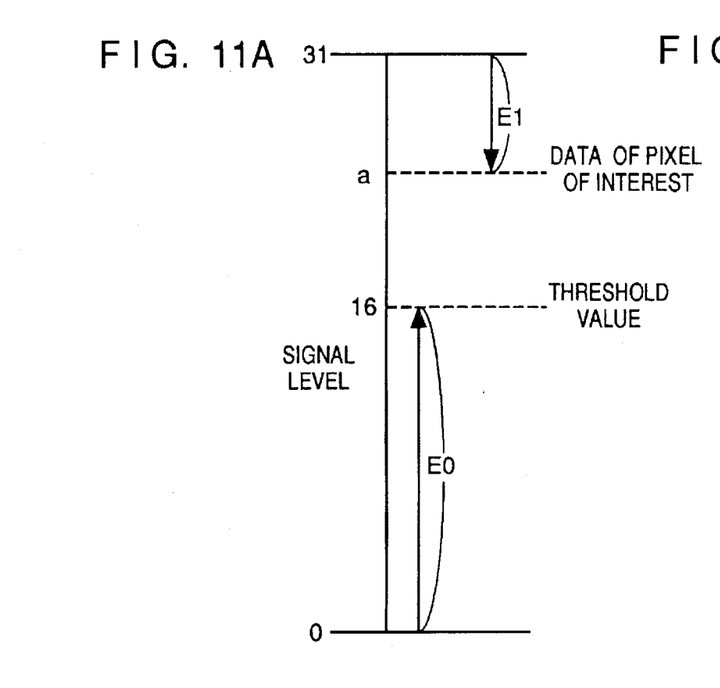
FIGS. 11A and 11B are diagrams for describing binarization by the error-diffusion method.
Figure 11B:
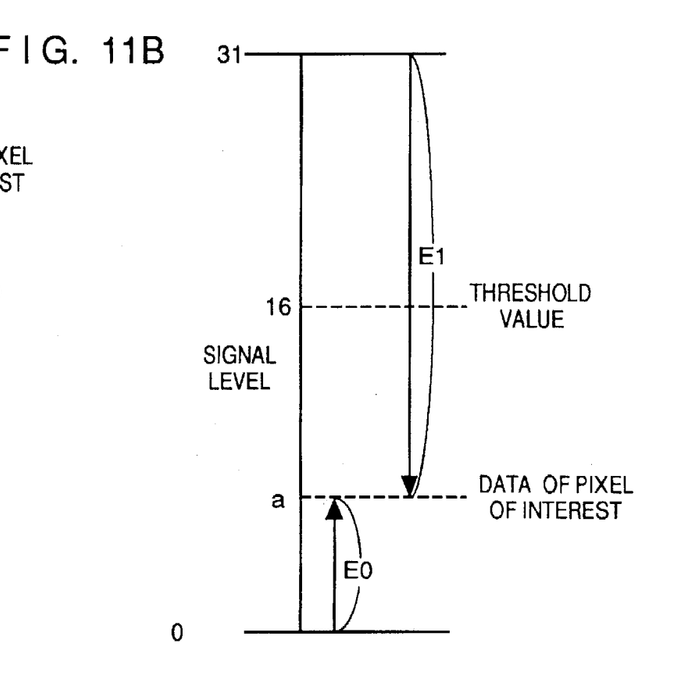

FIGS. 11A and 11B are diagrams for describing binarization by the error-diffusion method. In FIGS. 11A and 11B, the input data (five-bit data) indicative of the pixel of interest takes on a value of 0 to 31, the binarization threshold value is made 16 and the level of input data that has been subjected to error correction is represented by a. In a case where the input data level a is greater than the threshold value, as shown in FIG. 11A, the binarized data rises to the "H" level and the binarization error produced by this binarization becomes E1. Further, in a case where the input data level a is less than the threshold value, as shown in FIG. 11B, the binarized data assumes the "L" level and the binarization error produced by this binarization becomes E0. With respect to such binarization, the binarized output is controlled to the "H" level or "L" level, regardless of the value of the input data a, by the control signal f, the mode signal g and the signal e from the forbidden-area decision unit, just as described in this embodiment. In this case, error correction of the binarization errors E1, E0 generated is performed by distributing the generated error to the pixels of the neighboring area in dependence upon the binarized output signal, just as described in this embodiment. Hence, it can be so arranged that no disturbance is produced in the binarized output overall.

It goes without saying that other binarization techniques can be applied to the present invention.

It should be noted that there is no limitation upon the area in which binarized data indicative of the neighbor of the pixel of interest is detected by the forbidden-area decision unit of the first and second embodiments. Furthermore, the area in which the binarized data of the neighbor of the pixel of interest is detected may differ between two cases, namely a case in which control is performed in such a manner that the binarized output signal h is forcibly raised to the "H" level and a case in which control is performed in such a manner that the binarized output signal h is forcibly lowered to the "L" level, in dependence upon the level of the mode signal g.

Further, the apparatus can be constructed so as to greatly reduce the amount of circuitry. This can be done by using an area included in the neighboring area of the pixel of interest shown in FIG. 3, as an area for detecting the density of the area neighboring the pixel of interest in the forbidden-area decision unit 6, thereby making it possible to share arithmetic circuitry and share the binarized output signal stored in the memory. Furthermore, data may be added on to the binarized output signal not only by adopting the same data on the same line in the V direction. That is, data may be added on by mixing a case in which the spacing between the "H" levels in the binarized output signal h is made an odd number and a case in which this is made an even number within the same line in the V direction.

With regard to an "H" -level signal forcibly added on in a case where it is so arranged that a pattern of continuous "H" levels is obtained by forcibly generating binary-output "H" levels when an isolated binary-output "H" level appears at predetermined pixel intervals, it may be arranged so that no reference is made to this "H"-level signal at calculation of neighboring density in subsequent binarization processing. As a result, in a case where there are two continuous "H"-level patterns in an area in which the density value is somewhat high, it is possible to prevent the tendency for an "L"-level pattern to be generated in the surrounding area.

The present invention can be applied to a system constituted by a plurality of devices or to an apparatus comprising a single device. Furthermore, it goes without saying that the invention is applicable also to a case where the object of the invention is attained by supplying a program to system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for forming a pseudo-halftone image which includes predetermined additional information, comprising:

first input means for inputting multivalued image data for a target pixel of an image;

second input means for inputting the predetermined additional information;

conversion means for converting the multivalued image data input by said first input means into binary data using binary data of neighboring pixels which neighbor the target pixel;

determination means for determining final binary data for the target pixel based on the binary data converted by said conversion means and the predetermined additional information input by said second input means;

memory means for storing the final binary data determined by said determination means; and feedback control means for feeding the final binary data stored in said memory means back to said conversion means, the final binary data being used as binary data of a neighboring pixel by the conversion means to convert multivalued image data of a subsequent pixel into binary data.

2. The apparatus according to claim 1, further comprising output means for outputting the final binary data determined by said determination means.

3. The apparatus according to claim 2, wherein said output means includes an ink-jet printer which records serially.

4. The apparatus according to claim 1, wherein said first input means comprises:
- a scanner for reading an image of an original to produce an analog image signal; and
- analog to digital converting means for converting the analog image signal into the multivalued image data.

5. The apparatus according to claim 1, wherein said conversion means comprises computing means for (1) designating pixels within a predetermined area around the target pixel as the neighboring pixels, and (2) computing an average density of the neighboring pixels by applying a predetermined weight to final binary data of each neighboring pixel fed back by said feedback control means, and
- wherein said conversion means binarizes the multivalued image data on the basis of the average density computed by said computing means.

6. The apparatus according to claim 1, wherein said conversion means includes distributing means for distributing an error produced by the conversion means to a plurality of pixels which will subsequently undergo binarization.

7. The apparatus according to claim 1, wherein the additional information is information obtained by converting a manufacturing serial number or product code of said apparatus into a bit pattern.

8. The apparatus according to claim 1, wherein pixels processed by the image forming apparatus form a predetermined pattern in a predetermined direction.

9. The apparatus according to claim 1, wherein said conversion means comprises:
- first computing means for (1) designating pixels within a predetermined area around the target pixel as the neighboring pixels, and (2) computing an average density of the neighboring pixels by applying a predetermined weight to final binary data of each neighboring pixel fed back by said feedback control means;
- second computing means for obtaining a first average density in a case where a value of the target pixel represented by the multivalued image data has been binarized to "1", said first average density including the value of said target pixel and values of the neighboring pixels, and a second average density in a case where the value of a pixel represented by the multivalued image data has been binarized to "0", said second average density including the value of said target pixel and values of the neighboring pixels; and
- binarization means for using the first and second average densities to binarize the multivalued image data to produce the binary data.

10. The apparatus according to claim 1, wherein said conversion means converts the multivalued image data into binary data via error-diffusion.

11. An image forming apparatus for forming a pseudo-halftone image which includes predetermined additional information, comprising:
- input means for inputting multivalued image data for a target pixel of an image;
- binarizing means for binarizing the multivalued image data using binary data of neighboring pixels which neighbor the target pixel;
- determination means for determining final binary data for the target pixel based on the binary data obtained by said binarizing means and the predetermined additional information; and
- feedback means for feeding the final binary data obtained by said determination means back to said binarizing means, the final binary data being used as binary data of a neighboring pixel by the binarizing means to binarize subsequently input multivalued image data.

12. The apparatus according to claim 11, wherein said binarizing means performs binarization based on an average density of the neighboring pixels of the target pixel.

13. The apparatus according to claim 11, wherein said binarizing means comprises:
- adding means for adding a binarization error to a value of the target pixel represented by multivalued image data, the binarization error having been produced by binarization of previously input multivalued image data;
- distributing means for distributing the binarization error produced by said binarizing means to a plurality of pixels which will subsequently undergo binarization; and
- memory means for storing the binarization error distributed by said distributing means.

14. The apparatus according to claim 11, wherein the predetermined additional information is obtained by converting a manufacturing serial number or product code of said apparatus into a bit pattern in which black pixels are either even or odd pixels, taking into consideration a predetermined direction in a binary pattern produced by the binary data generated by said binarizing means.

15. The apparatus according to claim 11, further comprising output means for outputting the final binary data determined by said determination means.

16. The apparatus according to claim 15, wherein said output means includes an ink-jet printer which records serially.

17. The apparatus according to claim 11, wherein said input means includes:
- a scanner for reading an image of an original; and
- converting means for converting an image signal, which has been read by said scanner, to a multivalued digital image signal.

18. A method for forming a pseudo-halftone image which includes predetermined additional information, comprising:
- an input step of inputting multivalued image data for a target pixel of an image;
- a binarizing step, performed by binarizing means, for binarizing the multivalued image data using binary data of neighboring pixels which neighbor the target pixel;
- a determining step for determining final binary data for the target pixel based on the binary data obtained by the binarizing means and the predetermined additional information; and
- a feedback step of feeding the final binary data obtained in said determining step back to the binarizing means, the final binary data being used as binary data of a neighboring pixel by the binarizing means to binarize subsequently input multivalued image data.

* * * * *